No Printed Specification Available
7514X
E. Reed.
Construction of Scows.
Patented Apr. 6, 1833.
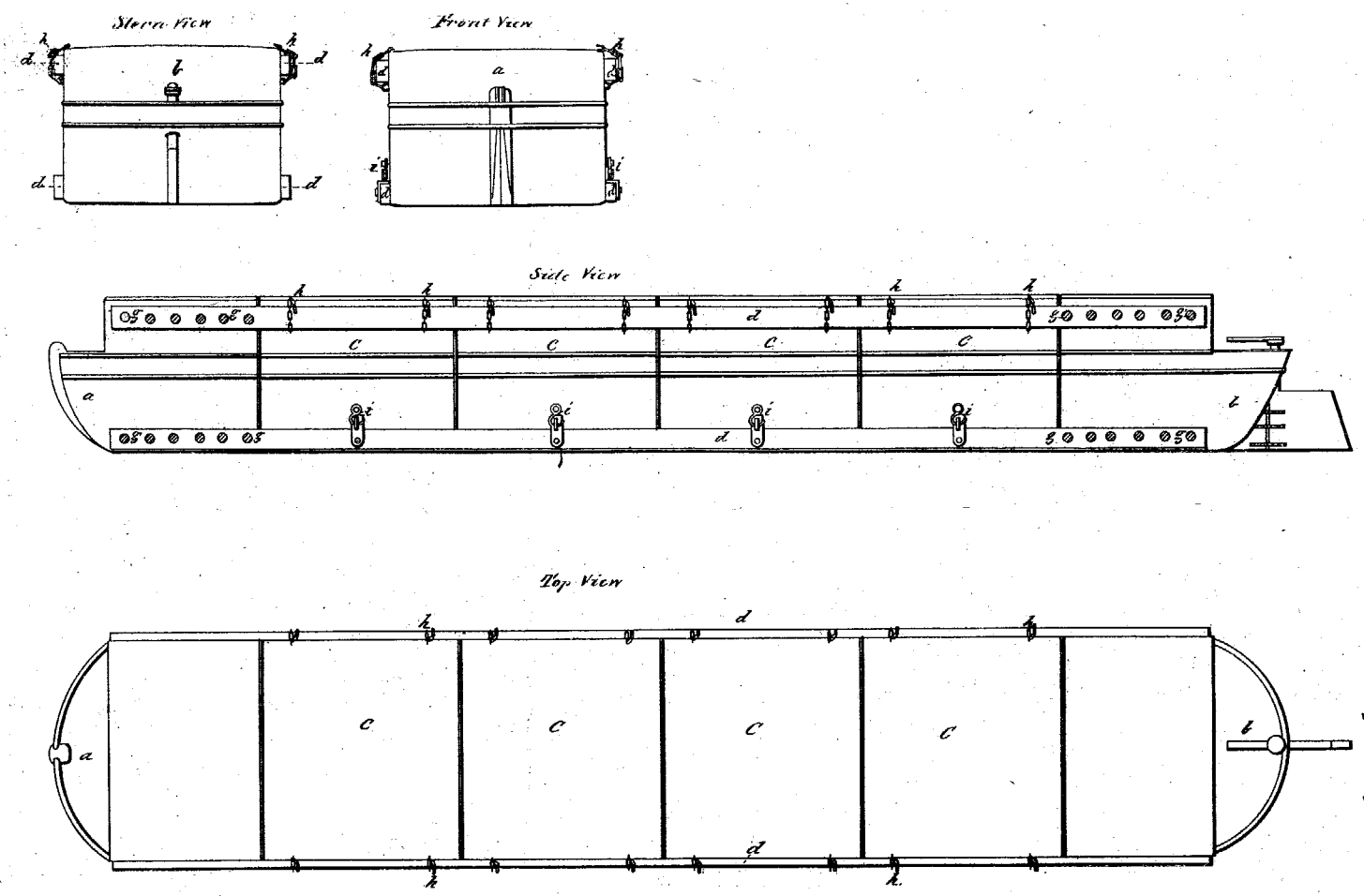
N. PETERS, PHOTO-LITHOGRAPHER, WASHINGTON, D. C.

7314X April 6, 1833 [illegible]

Ezra Reed.

Letters Patent. Patented April 6. 1833. —

The Schedule referred to ~~in those~~ in these Letters Patent and making part of the same, containing a description in the words of the said Ezra Reed himself, of his improvement in the Canal Boat.

---

To all to whom these Presents shall come:

Be it known, that I, Ezra Reed, of the Borough of Potts town, County of Montgomery, and State of Pennsylvania, have invented a new and useful improvement on a Canal Boat, and that the following is a full and exact description of the construction and operation of said Canal Boat as invented or improved by me, namely:

A flat bottomed boat, built in six, or more, or less parts or sections, which when united, will form a boat, resembling in appearance the usual form of canal boats, with a sharp or rounding bow, and either tapering or becoming narrower towards the stern, or holding an equal width from bow to stern.

The parts or sections to be united and kept together by two pieces of plank or timber, on each side of and running the entire length of the boat: one piece on a line with the bottom, and the other on or near a line with the top of the boat, and to be fastened with spikes or bolts, to the bow section and to the stern section. The other, or middle parts or sections, to be kept in their proper places and at equal distances from each other, and from the bow and stern sections, by chains, or other apparatus, connecting the parts with the long side pieces above described.

This boat is intended to be propelled by similar power, and employed in similar pursuits, as are, or may be other canal boats.

The benefits expected from this improvement are, a saving in the cost of construction, greater strength and durability; and this boat being of less specific gravity, or lighter, than other boats, as well as flat bottomed, will necessarily be of greater capacity of burden.

Boats and canal boats have been in use from time immemorial; I therefore claim the discovery, or invention, only of the division into parts or sections

135

7514X and unites themselves in manner and for the purposes above described.

Pelham March 23d 1833.

Witnesses
David Pelle
John Pelle

Ezra Reed (Seal)